Aug. 15, 1950     E. E. EATON     2,519,032
SYNCHRONIZER
Filed Sept. 12, 1947     2 Sheets-Sheet 1
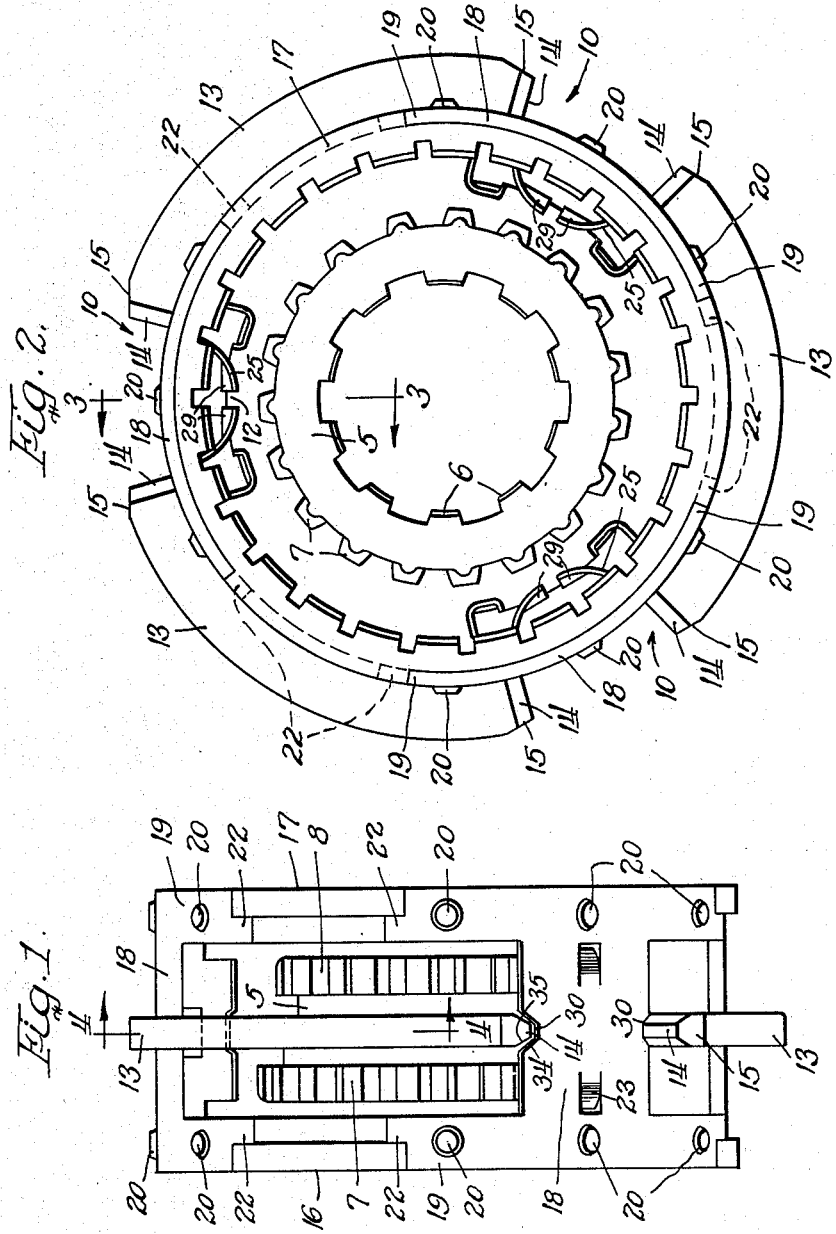
Inventor
Ernest E. Eaton
By Walter E. Schirmer
Atty.

Aug. 15, 1950    E. E. EATON    2,519,032
SYNCHRONIZER
Filed Sept. 12, 1947    2 Sheets-Sheet 2
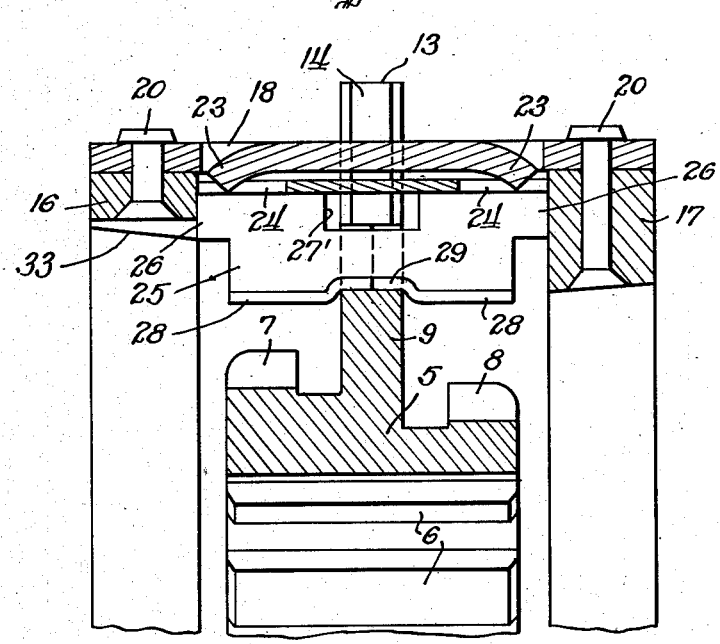
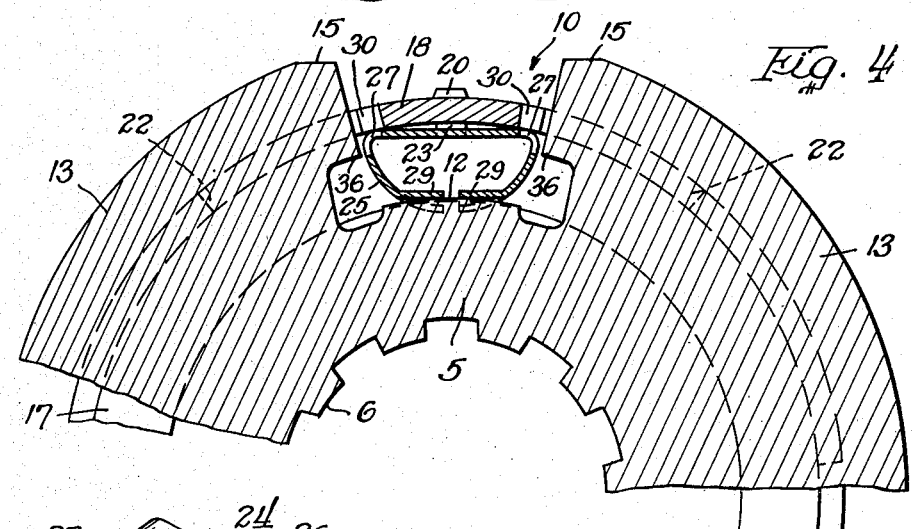
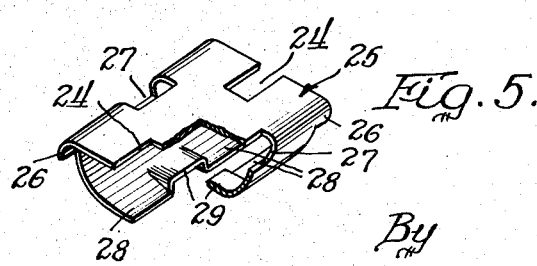
Inventor
Ernest E. Eaton.
By Walter E. Schirmer
Atty.

Patented Aug. 15, 1950

2,519,032

UNITED STATES PATENT OFFICE 2,519,032

SYNCHRONIZER

Ernest E. Eaton, Buchanan, Mich., assignor to Clark Equipment Company, Buchanan, Mich., a corporation of Michigan Application September 12, 1947, Serial No. 773,708

5 Claims. (Cl. 192—53)

This invention relates to synchronizers and more particularly is concerned with synchronizers of the type disclosed in my co-pending application, Serial No. 773,709, filed September 12, 1947, with certain changes and modifications in the construction thereof.

One object of the present invention is to provide a synchronizer in which the clutch hub is so formed as to provide a radially extending interrupted annular ring portion which is suitable for use as a yoke collar to be engaged by the shifting mechanism.

Another object of the present invention is to provide a construction in which the synchronizer cones are formed into a unit assembly for use with the clutch hub by means of circumferentially spaced arcuately shaped metal stampings acting both as rigid spacing members between the synchronizer cones and also as the members for producing the blocking action in the actuation of the synchronizer and for holding the detent springs within the synchronizer against shifting movement.

Still another object of the present invention is to provide a synchronizer of this type in which the clutch hub, extending arms and yoke collar are formed as an integral forging which requires relatively inexpensive machining in order to complete it for assembly into the synchronizer mechanism.

Other objects and advantages of the present invention, such as reduction in cost of manufacture, ease of assembling, and sturdiness, will be more apparent from the following detailed description, which, taken in conjunction with the accompanying drawings, will disclose to those skilled in the art, the particular construction and operation of a preferred form of the present invention.

In the drawings:

Figure 1 is an end elevational view of a synchronizer embodying the present invention.

Figure 2 is a side elevational view of the mechanism shown in Figure 1.

Figure 3 is a sectional view taken substantially on line 3—3 of Figure 2.

Figure 4 is a sectional view taken substantially on line 4—4 of Figure 1; and

Figure 5 is a perspective view of the spring member employed in the synchronizer.

Referring now in detail to the drawings, the synchronizer mechanism consists primarily of a clutch hub 5, having internal splines 6 for mounting it upon a transmission shaft or the like, and having axially spaced external clutch teeth 7 and 8 of the usual chamfered type at opposite ends of the hub portion thereof.

The clutch hub 5 has an extending annular flange portion 9, which is interrupted at circumferentially spaced points, as indicated at 10 in Figure 4, to provide openings therein. These openings 10 are defined at their inner end by machined surfaces 12 of arcuate form, these surfaces being located at each of the openings 10 and there preferably being three or more of such openings formed in the flange 9. The remaining portion of the flange 9 intermediate the openings 10 extends radially outwardly, as indicated at 13, projecting through the synchronizer sleeve assembly to be described hereinafter and forming an interrupted annular yoke collar for engagement by the shift actuating mechanism. The edges of portions 13, which define the openings 10, in the periphery of the clutch hub, are beveled to provide wedge shaped edges 14, as shown clearly in Figure 1 and are preferably slightly flatted at the top, as indicated at 15, so as to present no sharp corners to the encircling yoke by which the clutch hub is to be shifted.

The synchronizer sleeve assembly comprises a pair of axially spaced synchronizer rings 16 and 17, preferably formed of bronze, which are held in definite spaced relationship by means of arcuate formed metal stampings 18, which have lateral edges 19 disposed in recessed portions in the periphery of the rings 16 and 17, so as to be firmly embedded therein, and are firmly secured in position by means of the rivets 20. These lateral edges 19 are also provided with short circumferentially extending end portions 22 to provide for secure locking of the rings 16 and 17 in fixed parallel spaced relationship to provide the complete synchronizer sleeve assembly.

The intermediate portions of the spacers 18, between the rings 16 and 17, are provided with opposed inwardly struck ear portions 23, as shown in Figures 1 and 3, which ear portions are adapted to extend into slotted openings 24, formed in a spring member, indicated generally at 25, which spring member is shown clearly in Figure 4. The spring member 25 is thus held against circumferential shifting by means of these ears 23, which also hold it against relative cocking within the opening 10. The spring also is provided with laterally extending portions 26, bearing against the adjacent side walls of the rings 16 and 17 to locate the spring member against any possible lateral movement.

The spring, itself, is of flat spring steel formed into a substantially closed U-shape, with the bent corners thereof, indicated at 27, being slotted as shown clearly at 27' in Figure 3, for a purpose to be described in detail hereinafter. The extending leg portions of the spring 25 are provided with down turned wings 28 on opposite sides of the machined surfaces 12 of the clutch hub, providing, in effect, a central saddle portion 29, which seats over the surfaces 12 of the clutch hub, thereby normally maintaining the clutch hub in position in the center plane of the synchronizer sleeve assembly.

It will be noted that the interconnecting portions of the metal stampings 18, between the riveted edges 19, are provided with wedge shaped centrally located notches 30, in each edge thereof, which correspond to and are closely adjacent the wedge shaped edges 14 of the clutch hub extensions 13.

In the operation of the mechanism thus far described, assuming that the synchronizer is in the neutral position shown in Figure 3, and it is desired to shift the same axially to the left to engage the clutch teeth 7 thereof, with an adjacent clutch element of an associated gear, the initial operation comprises shifting, by means of a shift actuator engaging the peripherally extending portions 13 of the clutch hub, the entire assembly toward the left. Since the saddle portion 29 of the spring rides on the surface 12 of the clutch hub, the entire assembly moves as a unit until the conical surface 33 of the synchronizer ring 16 engages the corresponding conical surface of the associated gear. This produces a frictional drag tending to bring the associated gear and the synchronizer sleeve structure up to synchronous speed, which, in turn, produces relative rotation between the sleeve assembly and the clutch hub, forcing the corresponding edges 14 of the extensions 13 into the wedge shaped notches 30 of the members 18. This produces a blocking action preventing further axial shifting of the assembly as a whole, and pressure is built up on the adjacent camming surfaces 34 and 35, shown in Figure 1, producing greater frictional drag to bring the synchronizer sleeve and the associated gear into synchronous relationship. As this occurs, the shifting pressure forces the clutch hub further to the left, producing a slight rotative action due to the camming action of the surfaces 34 and 35, and also forcing the end portions or saddles 29 of the spring elements 25 outwardly to allow independent movement of the clutch hub 5 to the left, bringing the gear 7 into meshing engagement with the associated clutch teeth of the adjacent gear. The camming action heretofore mentioned, has a tendency to rotate the clutch teeth 7 relative the teeth of the adjacent gear, to prevent endwise abutment therebetween, and provide a smooth clutching action.

If the shift is made in the opposite direction to disengage the synchronizer, the clutch hub 5 is first moved to the right, disengaging the teeth 7 from the associated gear, and as it moves further in this direction, the surfaces 12 thereof, move into alinement with the saddle portions 29 of the spring 25, thereby centering the synchronizer sleeve with respect to the clutch hub in the neutral position to condition the same for another clutching engagement. The openings 27', formed in the bent corners of the spring are to provide clearance for the inner edges 36 of the wedge shaped ends 14 of the extensions 13 to clear the springs as they move into the notches 30 formed at opposite sides of the intermediate portion of the spacer members 18.

It is therefore believed that with the present construction, a simplified synchronizer mechanism is provided, in which the synchronizer cones are assembled in rigid parallel relationship by means of metal stampings which, in turn, provide the blocking action for the synchronizer and also the means for supporting the spring elements which provide for first conjoint and then separating movement of the sleeve and hub.

I am aware that certain changes may be made in details of the present construction without in any way departing from the underlying principles thereof, and I therefore do not intend to be limited except as defined by the scope and spirit of the appended claims.

I claim:

1. In a synchronizer, a clutch hub member having a radially extending annular flange formed with circumferentially spaced openings, synchronizer sleeve means having spacer members extending transversely of said annular flange through the openings in the latter, spring means in each of said openings comprising a substantially closed U-shaped spring member having leg portions extending toward each other and extending transversely of said annular flange beneath said spacer members, said leg portions being recessed adjacent their ends to form a saddle portion for seating over the walls at the inner ends of said openings, said spacer members at opposite sides of said annular flange having inwardly projecting ear portions, and the bight portions of said spring members having slotted openings at the opposite ends thereof into which said ear portions project for preventing circumferential shifting movement of said spring members relative to said synchronizer sleeve means.

2. In a synchronizer, a clutch hub member having a radially extending flange formed with circumferentially spaced openings defined by edges extending radially inwardly of the periphery thereof, synchronizer sleeve means having spacer members extending transversely of said annular flange through the openings in the latter, the radially inwardly extending edges defining the openings in said annular flanges and the edges of said spacer members facing said openings being provided with mating cam surfaces, spring means in each of said openings comprising a substantially closed U-shaped spring member extending transversely of said annular flange having leg portions extending toward each other and connected by intermediate bight portions with the bight portions thereof in engagement with the inner surfaces of said spacer members, and the corners of said spring members connecting the bight portions thereof with said leg portions being slotted in alignment with the cam surfaces on said spacer members to provide for engagement of said mating surfaces of said openings and said spacer members.

3. The synchronizer of claim 2 further characterized by the ends of said leg portions of said spring members being recessed adjacent their ends to form saddle portions for seating over the walls at the inner ends of the openings in the annular flange of the hub member.

4. The synchronizer of claim 2 further characterized by the ends of said leg portions of said spring members being recessed adjacent their ends to form saddle portions for seating over the walls at the inner ends of the openings in the annular flange of the hub member, and by said spacer members at opposite sides of said annular flange having inwardly projecting ears fitting into slots formed in the bight portions of the spring members for preventing circumferential movement of said spring members relative to the synchronizer sleeve.

5. Spring means for a synchronizer comprising a spring steel member of substantially closed U-shape having a bight portion and curved leg portions extending toward each other, said curved leg portions having wing portions at their outer ends forming a saddle portion, slots in the corners formed by said bight and leg portions, and slots extending inwardly of the end edges of said bight portion.

ERNEST E. EATON.

REFERENCES CITED

The following references are of record in the file of this patent:

UNITED STATES PATENTS

| Number | Name | Date |
| --- | --- | --- |
| 2,256,308 | Bixby et al. | Sept. 16, 1941 |
| 2,391,268 | Peterson et al. | Dec. 18, 1945 |
| 2,409,148 | Peterson et al. | Oct. 8, 1946 |
| 2,425,203 | Peterson et al. | Aug. 5, 1947 |